US010633086B2

(12) United States Patent
Carr et al.

(10) Patent No.: US 10,633,086 B2
(45) Date of Patent: Apr. 28, 2020

(54) ROTORCRAFT ANTI-TORQUE AND DIRECTIONAL CONTROL USING A CENTRIFUGAL BLOWER

(71) Applicant: Bell Helicopter Textron Inc., Fort Worth, TX (US)

(72) Inventors: Matthew R. Carr, Hurst, TX (US); Matthew E. Louis, Fort Worth, TX (US); Kirk L. Groninga, Keller, TX (US); Daniel B. Robertson, Southlake, TX (US); Frank B. Stamps, Colleyville, TX (US); Albert G. Brand, N. Richland Hills, TX (US); Eric A. Sinusas, Euless, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 434 days.

(21) Appl. No.: 15/468,069

(22) Filed: Mar. 23, 2017

(65) Prior Publication Data

US 2018/0273167 A1 Sep. 27, 2018

(51) Int. Cl.
*B64C 27/82* (2006.01)
*F04D 17/16* (2006.01)
*F04D 29/46* (2006.01)

(52) U.S. Cl.
CPC .............. *B64C 27/82* (2013.01); *F04D 17/16* (2013.01); *F04D 29/462* (2013.01); *B64C 2027/8245* (2013.01); *B64C 2027/8254* (2013.01)

(58) Field of Classification Search
CPC .............. B64C 27/82; B64C 2027/8245
See application file for complete search history.

(56) References Cited

U.S. PATENT DOCUMENTS

| 4,660,785 | A | | 4/1987 | Munski | |
| 4,948,068 | A | * | 8/1990 | VanHorn | B64C 27/82 244/17.19 |
| 5,205,512 | A | | 4/1993 | Rumberger | |
| 5,240,205 | A | * | 8/1993 | Allongue | B64C 27/82 244/17.19 |

(Continued)

FOREIGN PATENT DOCUMENTS

| EP | 3406521 A1 | 11/2018 |
| GB | 892011 A | 3/1962 |

OTHER PUBLICATIONS

EPO Search Report issued in EP Application 17185863.2 dated Mar. 2, 2018, 4 pages.

(Continued)

*Primary Examiner* — Assres H Woldemaryam
(74) *Attorney, Agent, or Firm* — Patent Capital Group (57) ABSTRACT

A rotorcraft comprises a fuselage, a tail boom, a rotor system, and a centrifugal blower system. The centrifugal blower system comprises a centrifugal blower configured to generate thrust using an airflow, wherein the centrifugal blower is located within the tail boom. The centrifugal blower system also comprises a plurality of ducts configured to control the thrust generated by the centrifugal blower, wherein the plurality of ducts is located on a portion of the tail boom surrounding the centrifugal blower, and wherein the plurality of ducts comprises one or more adjustable ducts configured to vary a size of an associated duct opening.

18 Claims, 5 Drawing Sheets

(56) References Cited

U.S. PATENT DOCUMENTS

| | | | | |
|---|---|---|---|---|
| 6,021,976 | A * | 2/2000 | Exter | B64C 27/82 244/17.19 |
| 6,464,552 | B1 * | 10/2002 | Streich | A63H 27/12 123/41.65 |
| 6,755,374 | B1 * | 6/2004 | Carson | B64C 27/82 244/17.11 |
| 7,959,105 | B2 * | 6/2011 | Marze | B64C 11/001 244/17.19 |
| 8,596,570 | B1 * | 12/2013 | Carambat | B64C 11/006 244/12.1 |
| 9,409,643 | B2 | 8/2016 | Mores et al. | |
| 2012/0187237 | A1 * | 7/2012 | Dickman | B64C 27/82 244/17.13 |
| 2012/0318910 | A1 * | 12/2012 | Smith | B64C 27/82 244/52 |
| 2013/0087653 | A1 * | 4/2013 | Brand | B64C 27/82 244/17.21 |
| 2013/0119186 | A1 * | 5/2013 | Heid | B64C 27/82 244/17.21 |
| 2013/0168490 | A1 * | 7/2013 | Ashford | B64C 27/82 244/17.19 |
| 2015/0191245 | A1 | 7/2015 | Mores et al. | |
| 2018/0087561 | A1 * | 3/2018 | Birkenheuer | B64C 27/12 |

OTHER PUBLICATIONS

EPO Examination Report issued in EP Application 17185863.2 dated Mar. 15, 2018, 5 pages.

* cited by examiner

ROTORCRAFT ANTI-TORQUE AND DIRECTIONAL CONTROL USING A CENTRIFUGAL BLOWER

TECHNICAL FIELD

This disclosure relates generally to rotorcraft design, and more particularly, though not exclusively, to rotorcraft anti-torque and directional control.

BACKGROUND

A rotorcraft requires some form of anti-torque and direction control in order to counteract the torque effect of the main rotor, and also to control the direction of the rotorcraft. In some cases, a rotorcraft may include a tail rotor to provide anti-torque and direction control. Tail rotors, however, suffer from various safety and performance drawbacks.

SUMMARY

According to one aspect of the present disclosure, a rotorcraft comprises a fuselage, a tail boom, a rotor system, and a centrifugal blower system. The centrifugal blower system comprises a centrifugal blower configured to generate thrust using an airflow, wherein the centrifugal blower is located within the tail boom. The centrifugal blower system also comprises a plurality of ducts configured to control the thrust generated by the centrifugal blower, wherein the plurality of ducts is located on a portion of the tail boom surrounding the centrifugal blower, and wherein the plurality of ducts comprises one or more adjustable ducts configured to vary a size of an associated duct opening.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

Figure 1:
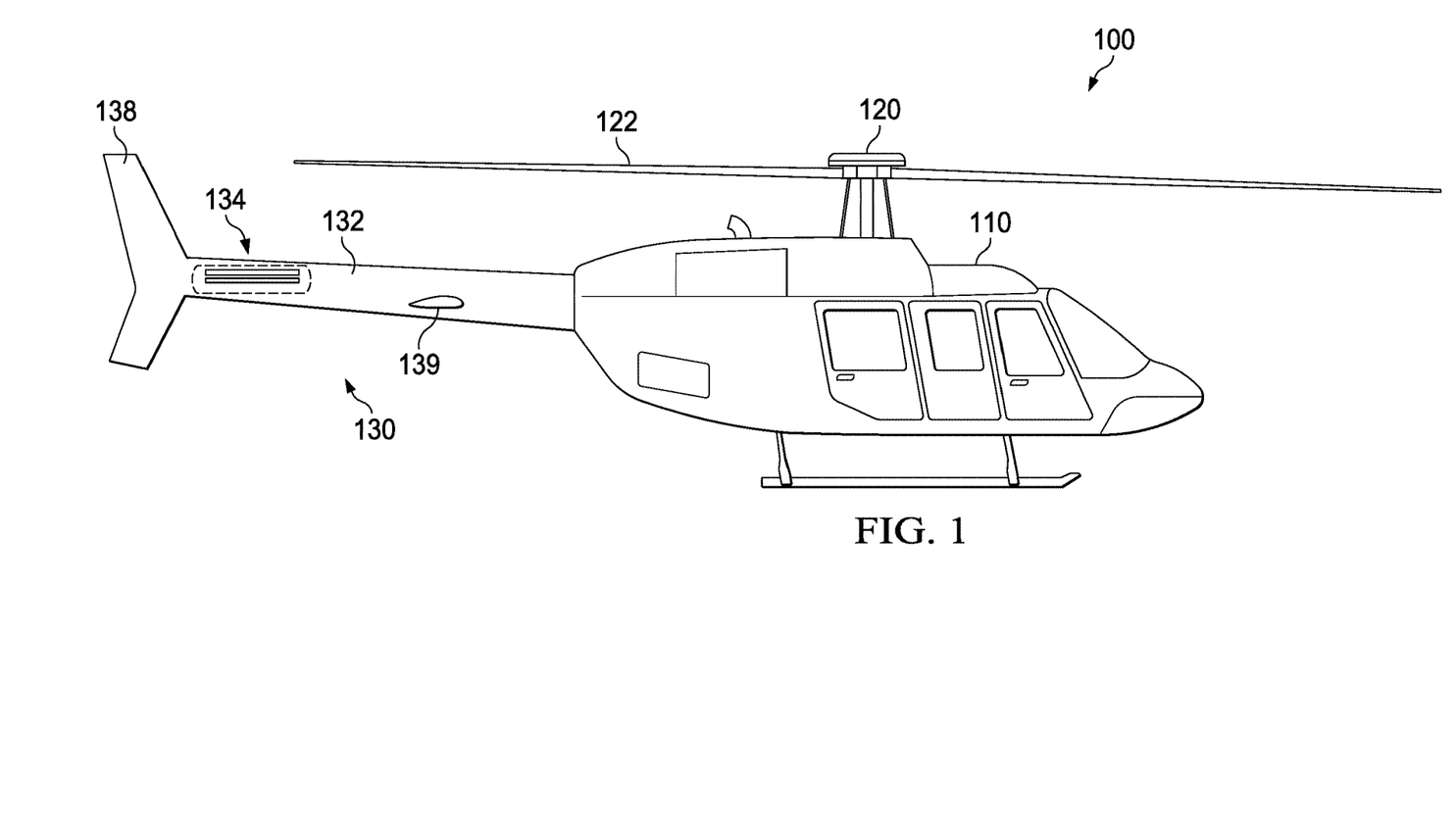
FIG. 1 illustrates an example rotorcraft in accordance with certain embodiments.

FIG. 1 illustrates an example embodiment of a rotorcraft 100. Rotorcraft 100 includes a fuselage 110, a rotor system 120, and an empennage 130. The fuselage 110 is the main body of the rotorcraft, which includes a cabin for the crew, passengers, and/or cargo, and may also house certain mechanical and electrical components, such as the engine(s), transmission, and flight controls. The rotor system 120 includes a plurality of rotor blades 122 that are used to generate lift. The rotor blades 122, for example, can generate lift by rotating when torque is supplied by the engine(s). Moreover, the pitch of each rotor blade 122 can be adjusted in order to selectively control direction, thrust, and lift for the rotorcraft 100. The empennage 130 of the rotorcraft includes a tail boom 132, a horizontal fin or stabilizer 139, and a vertical fin or stabilizer 138. Moreover, the tail boom 132 also houses a centrifugal blower system 134, described further below.

Centrifugal blower system 134 is used to provide anti-torque control and direction or yaw control for rotorcraft 100. By contrast, some rotorcraft may provide anti-torque and direction control using a traditional tail rotor and/or rudder. A traditional tail rotor impacts operator safety immensely, however, as the exposed rotor is a significant safety hazard, particularly when located at or near the height of a person. In particular, a tail rotor presents a dangerous risk of contact with people and objects, such as powerlines and other wires, trees, fences, and so forth. There are also various performance drawbacks associated with a traditional tail rotor system, including additional drag and excessive noise.

Moreover, some rotorcraft may use other alternatives to traditional tail rotor systems, such as FENESTRON or NOTAR (No Tail Rotor) systems. FENESTRON is an alternative tail rotor system that leverages a protective duct to reduce the safety risk presented by exposed rotor blades. For example, FENESTRON uses a "fan-in-tail" design that houses the rotor blades in a circular protective duct within the tail, thus reducing the risk of external contact with the tail rotor. FENESTRON rotor systems, however, suffer from various performance drawbacks. For example, FENESTRON uses a thick duct to protect the rotor blades, and thus requires a bulky and more complex tail structure, resulting in increased weight, power requirements, manufacturing time, and cost. Moreover, the FENESTRON protective duct is disruptive to the airflow of the tail rotor, resulting in air resistance that may reduce rotor performance and increase noise. NOTAR (No Tail Rotor) is another alternative system, which provides anti-torque and directional control without using a tail rotor. Rather, NOTAR uses an internal axial fan located between the fuselage and tail boom to force airflow down the tail boom, and then redirects the airflow sideways (e.g., by 90 degrees) to force it to exit through a fixed opening on one side of the tail boom, thus generating thrust that can be used for anti-torque and directional control. NOTAR also uses a jet thruster and vertical stabilizer to augment the anti-torque and directional control provided by the internal axial fan. NOTAR systems, however, suffer from various performance drawbacks. For example, redirecting the airflow by 90 degrees from its original direction reduces the thrust efficiency and increases complexity. Moreover, NOTAR uses a tail boom with a cylindrical shape rather than an airfoil shape, resulting in a less aerodynamic design that fails to leverage the benefits of a tail boom with an aerodynamic airfoil shape.

In the illustrated embodiment, rotorcraft 100 provides anti-torque and direction control using a centrifugal blower system 134 rather than a traditional tail rotor, rudder, or another alternative such as FENESTRON or NOTAR. For example, a centrifugal blower (not shown in FIG. 1) mounted internally within the aft end of tail boom 132 can be used to blow air radially to generate thrust (and lift) on either side of the tail boom. Moreover, a plurality of ducts can be used to control the thrust generated by the centrifugal blower. For example, variable aperture doors on both sides of the tail boom, along with adjustable Coanda slot(s), are used to direct the appropriate amount of thrust through the appropriate side(s) of the tail boom in order to provide anti-torque and directional control. Moreover, the tail boom 132 can be designed using an airfoil shape to further improve the aerodynamics of the rotorcraft.

The embodiments described throughout this disclosure provide numerous technical advantages. For example, centrifugal blower system 134 eliminates the need for a tail rotor and rudder. As a result, the performance drawbacks associated with tail rotors (e.g., safety risks, noise, drag) can be avoided, and the mechanical complexity, weight, and cost of the rotorcraft can be reduced (e.g., by eliminating tail rotor components such as the blades, intermediate gearboxes, and so forth). Alternatively, in some embodiments, a centrifugal blower system 134 can be used in conjunction with a tail rotor and/or tail rudder, for example, to augment or improve the anti-torque and direction control, or provide redundancy in the event of a system failure. Centrifugal blower system 134 also provides various performance improvements over NOTAR systems. For example, centrifugal blower system 134 eliminates the need to redirect airflow by 90 degrees, which reduces complexity and improves the thrust efficiency. Centrifugal blower system 134 also improves anti-torque and direction control by enabling the direction and intensity of the thrust to be selectively controlled (e.g., by adjusting the aperture doors on the tail boom to direct the appropriate amount of airflow to the appropriate side(s) of the tail boom). Centrifugal blower system 134 can also be implemented using a tail boom with an airfoil shape, resulting in a design that is more aerodynamic than the cylindrical tail boom used by NOTAR systems. Accordingly, centrifugal blower system 134 provides numerous benefits over existing approaches, including improved safety, acoustics (e.g., by reducing noise), and performance, and reduced complexity, cost, and weight, among other examples.

Example embodiments of a rotorcraft centrifugal blower system are described below with more particular reference to the remaining FIGURES. Moreover, it should be appreciated that rotorcraft 100 of FIG. 1 is merely illustrative of a variety of aircraft that can be used with embodiments described throughout this disclosure. Other aircraft implementations can include, for example, fixed wing airplanes, hybrid aircraft, tiltrotor aircraft, unmanned aircraft, gyrocopters, a variety of helicopter configurations, and drones, among other examples.

Figure 2A:
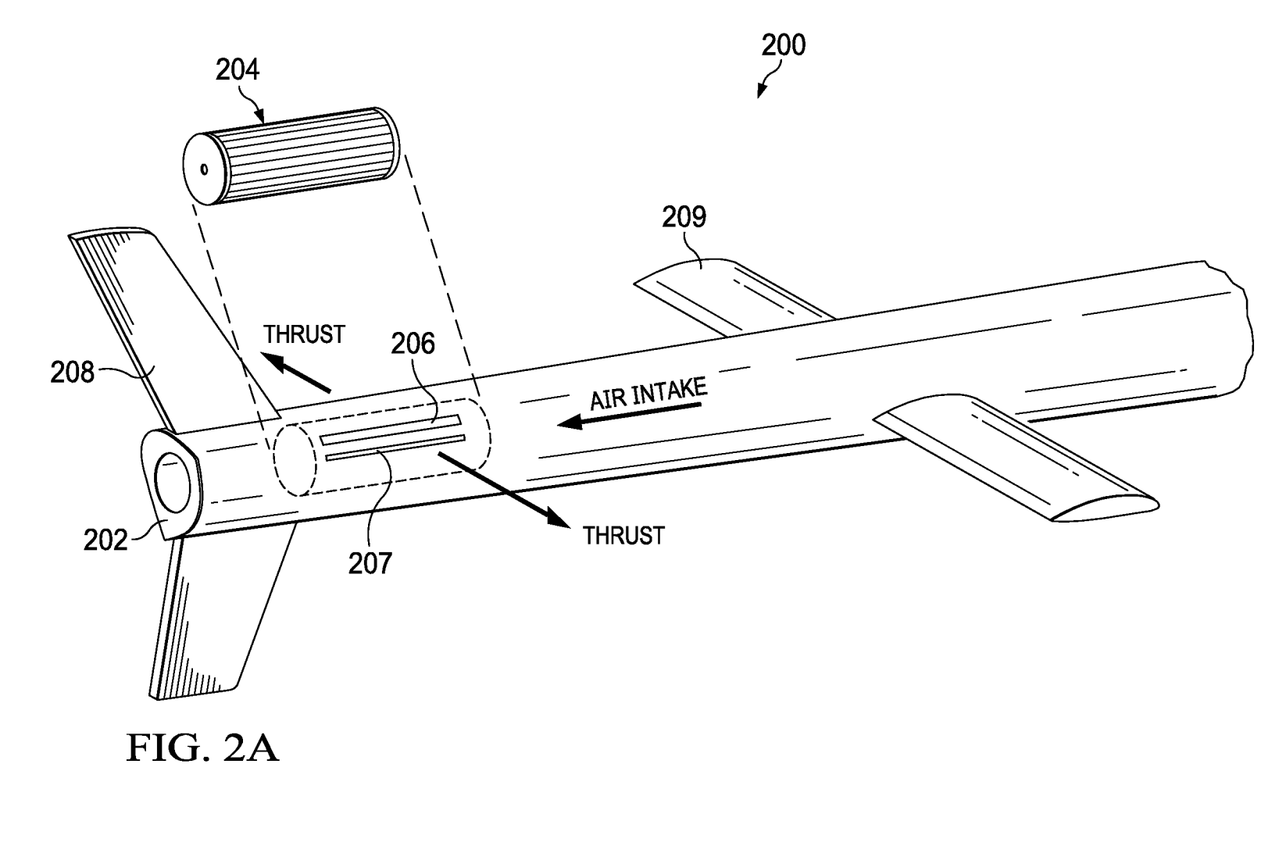
FIGS. 2A and 2B illustrate example embodiments of a centrifugal blower system for rotorcraft anti-torque and direction control.
Figure 2B:
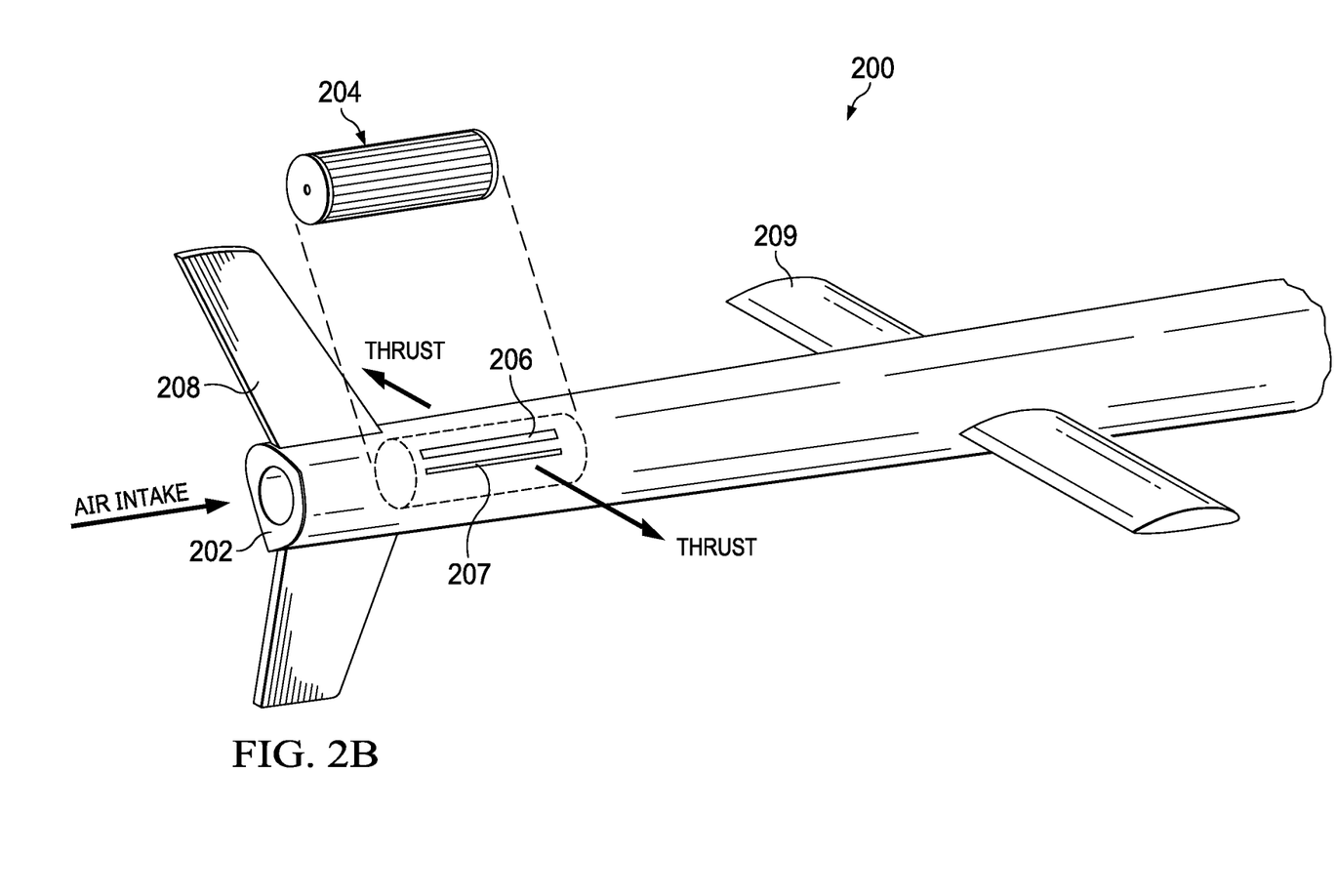

FIGS. 2A and 2B illustrate example embodiments of a centrifugal blower system 200 used for rotorcraft anti-torque and direction control. A centrifugal blower, which may also be referred to as a squirrel cage blower, is a mechanical device for moving air and other gases. A centrifugal blower uses rotating impellers or fan blades to increase the speed and volume of an air stream and displace the air radially. In some embodiments, for example, a centrifugal blower may be a drum shape fan wheel, composed of a plurality of fan blades mounted around a hub that turns on a driveshaft. Air enters the fan wheel axially, flows over the fan blades, and the centrifugal force from the rotating fan blades causes the air to accelerate and exit the blower radially. A centrifugal blower is quiet, reliable, and capable of operating over a wide range of conditions. As explained further below, centrifugal blower system 200 uses a centrifugal blower 204 to provide rotorcraft anti-torque and direction control.

In the illustrated embodiment, the tail boom 202 of a rotorcraft is shown. The illustrated tail boom 202 is designed using an airfoil shape to further improve the aerodynamics of the rotorcraft. The tail boom 202 also includes a horizontal stabilizer fin 209 and a vertical stabilizer fin 208. Moreover, a centrifugal blower 204 is mounted internally within the aft end of tail boom 202 (e.g., on the tail driveshaft), near the vertical fin 208. Unlike a traditional tail rotor, however, centrifugal blower 204 does not require a gearbox at the aft end of the tail boom 202. Centrifugal blower 204 includes an air intake that can be fed from the forward and aft ends of the tail boom 202. For example, centrifugal blower 204 can be fed with airflow from the forward end of the tail boom 202 using air that enters through a duct positioned near the main rotor, and/or using an axial blower positioned at the forward end of the tail boom 202. Similarly, centrifugal blower 204 can be fed with airflow from the aft end of the tail boom 202 using a tail boom 202 with an open aft end. Using the airflow from the intake, centrifugal blower 204 then expels air radially to generate thrust and lift on either side of the tail boom 202. Moreover, a plurality of ducts are used to control the thrust generated by centrifugal blower 204. For example, variable aperture doors 206 and one or more Coanda slots 207 are positioned on tail boom 202 to direct the radial airflow from centrifugal blower 204 out through the side(s) of tail boom 202 in order to generate thrust. For example, the portion of the tail boom 202 that houses centrifugal blower 204 includes variable aperture doors 206 on both sides of the tail boom 202, along with one or more Coanda slot(s) 207. The respective aperture doors 206 and Coanda slot(s) 207 are positioned on the tail boom 202 to direct the thrust generated by centrifugal blower 204 out through the sides of tail boom 202. In this manner, the resulting thrust can be leveraged for anti-torque and/or direction control.

The Coanda slot(s) 207, for example, can be used for anti-torque control. In the illustrated embodiment, the Coanda slot 207 is positioned on the side of tail boom 202 towards the top, and angled to direct airflow down the side of tail boom 202. Centrifugal blower 204 forces air through the Coanda slot 207 and down the side of tail boom 202, producing a flow of air around the tail boom 202 known as the Coanda effect. This creates thrust and generates lift on the side of the tail boom 202, which helps counteract the steady torque of the main rotor when in hover. In particular, the airfoil shape of the tail boom 202 provides a moment arm for the generated thrust, and the tail boom 202 effectively functions as a "wing" flying in the downwash of the main rotor system, which aids in producing the requisite anti-torque. Moreover, in forward flight, anti-torque may also be provided by a vertical stabilizer or fin 208. In some embodiments, Coanda slot 207 may be a fixed aperture that is always open. In other embodiments, however, Coanda slot 207 may be an adjustable aperture that can be opened and closed (e.g., using a door or covering) as needed.

The variable aperture doors 206 can be used to provide both anti-torque and direction control, for example, by directing a variable amount of thrust from the centrifugal blower 204 out through the side(s) of tail boom 202. In some embodiments, for example, the variable aperture doors 206 are positioned on each side of the tail boom 202. Moreover, the aperture doors 206 can be adjusted to vary the size of their respective openings, thus enabling a variable amount of thrust to be directed out either or both sides of tail boom 202. In this manner, centrifugal blower system 200 can be used to blow air radially out of the side(s) of tail boom 202, thus generating thrust and lift on the side(s) of the tail boom 202, which can be used to provide anti-torque and direction control for a rotorcraft. For example, the aperture doors 206 are positioned on each side of the tail boom 202 around centrifugal blower 204 (e.g., on the aft end of the tail boom 202), and can be opened and closed in order to direct the thrust generated by centrifugal blower 204. When devoted entirely to anti-torque control, one door 206 may be fully open and the other door 206 may be fully closed. In this manner, the entire thrust generated by centrifugal blower 204 is dedicated to anti-torque control, which may allow the blower to operate using less power. When used to provide both anti-torque and direction control, the aperture doors 206 may both be opened to different heights, resulting in split airflow, thus providing less anti-torque and more force in a particular direction. This enables a rotorcraft to yaw without a rudder, while still providing control to the pilot.

In this manner, centrifugal blower system 200 can be used to provide anti-torque and/or direction control for a rotorcraft. Centrifugal blower system 200 can be controlled by a pilot in the same manner as a traditional tail rotor, for example, using anti-torque pedals. The anti-torque pedals, however, are used to adjust the aperture doors 206 of the centrifugal blower system 200, rather than to adjust the pitch of tail rotor blades. Moreover, centrifugal blower 204 can be powered by a mechanical, electric, or hydraulic source. In some embodiments, centrifugal blower system 200 may include a mechanism to turn off or disable centrifugal blower 204 (e.g., when the rotorcraft is traveling at high speeds and the anti-torque or direction control of centrifugal blower 204 is unnecessary). For example, if centrifugal blower 204 is mechanically driven, a rotorcraft may include a clutch that can be used to disengage and disable centrifugal blower 204. Alternatively, if centrifugal blower 204 is electrically or hydraulically driven, a rotorcraft may include a control or switch that can be used to enable and disable centrifugal blower 204 (e.g., without using a clutch). Moreover, in some embodiments, centrifugal blower 204 may use fan blades with fixed pitch. In other embodiments, however, centrifugal blower 204 may use fan blades with variable collective pitch to manage the power required by centrifugal blower 204, and thus the centrifugal blower system 200 may also include a mechanism for controlling the pitch of the fan blades. Moreover, in some embodiments, the additional airflow created in the tail boom 202 by centrifugal blower 204 can be leveraged to provide a cooling system for the rotorcraft, for example, to cool the engine, exhaust, hydraulic systems, provide exhaust dilution, and so forth.

Figure 3:
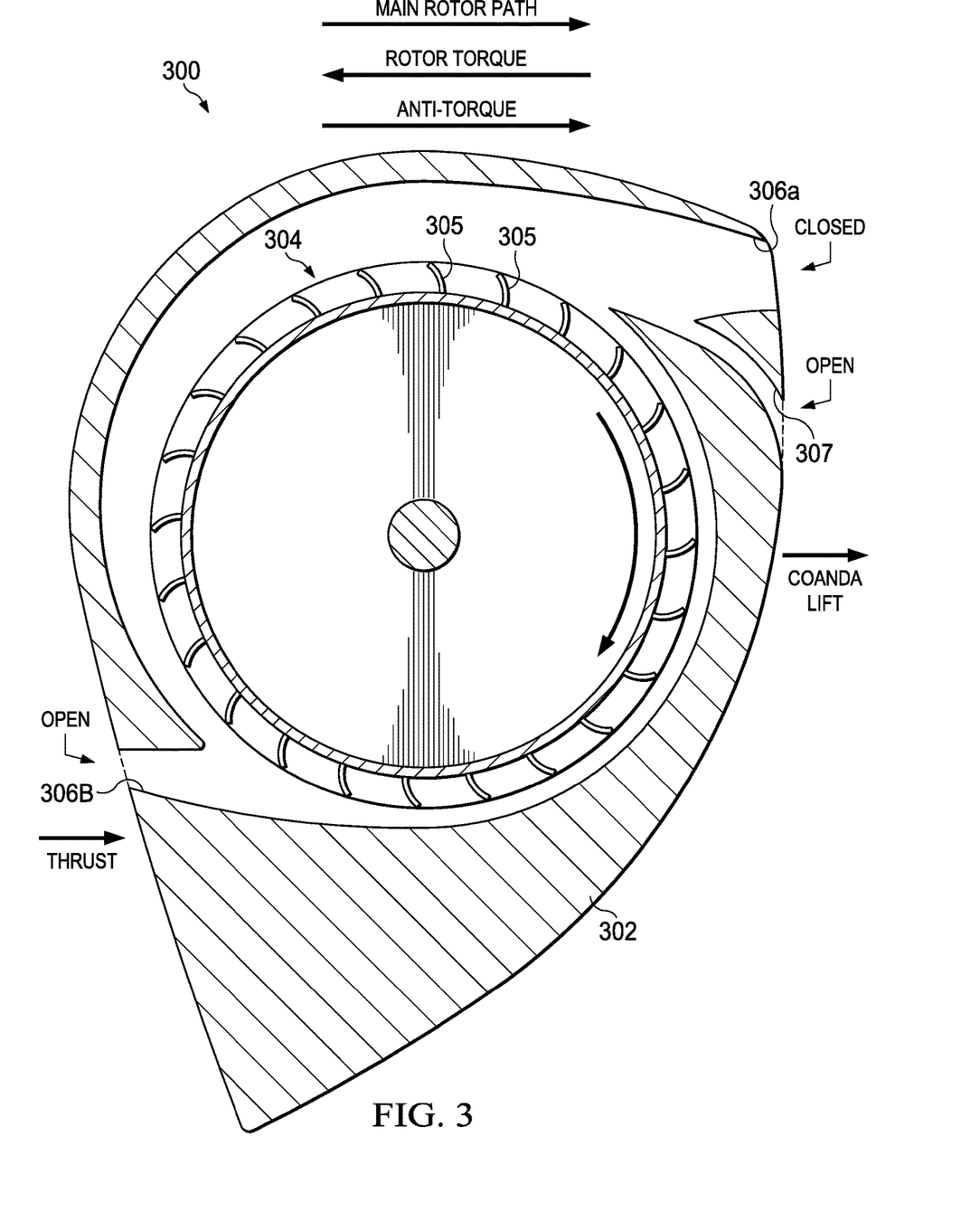
FIG. 3 illustrates a cross-section view of a centrifugal blower system.

FIG. 3 illustrates a cross-section view of a centrifugal blower system 300. The illustrated cross-section view is from a perspective looking forward from the aft end of a tail boom 302 of a rotorcraft.

In the illustrated example, centrifugal blower system 300 is implemented inside a tail boom 302 that has an aerodynamic airfoil shape. Tail boom 302 houses a centrifugal blower 304 that is mounted internally within the aft end of tail boom 302 (e.g., on the tail driveshaft). Centrifugal blower 304 includes a plurality of rotating impellers or fan blades 305. In some embodiments, the fan blades 305 may be spaced unevenly to distribute noise across different frequencies, thus reducing the overall noise produced by centrifugal blower 304. Centrifugal blower 304 uses the rotating fan blades 305 to displace airflow radially while also increasing the speed and volume of the airflow, which generates thrust. Moreover, a plurality of ducts are used to control the thrust generated by centrifugal blower 304. For example, variable aperture doors 306 and a Coanda slot 307 are positioned on tail boom 302 to direct the radial airflow from centrifugal blower 304 out through the side(s) of tail boom 302 to generate thrust. In this manner, the resulting thrust can be leveraged for anti-torque and/or direction control. In the illustrated example, variable aperture door 306a is closed (e.g., as shown by the solid line covering the opening), while variable aperture door 306b and Coanda slot 307 are open (e.g., as shown by the dashed line in the opening), thus generating thrust in the opposite direction of the torque from the main rotor.

The Coanda slot 307, for example, can be used for anti-torque control. In the illustrated embodiment, the Coanda slot 307 is positioned on the right side of tail boom 302 near the top, angled to direct airflow down the right side of tail boom 302. Centrifugal blower 304 forces air through the Coanda slot 307 and down the right side of tail boom 302, producing a flow of air around the tail boom 302 known as the Coanda effect. This creates thrust and generates lift on the side of the tail boom 302, which helps counteract the steady torque of the main rotor when in hover. In particular, the airfoil shape of the tail boom 302 provides a moment arm for the generated thrust, and the tail boom 302 effectively functions as a "wing" flying in the downwash of the main rotor system, which aids in producing the requisite anti-torque. In some embodiments, Coanda slot 307 may be a fixed aperture that is always open. In other embodiments, however, Coanda slot 307 may be an adjustable aperture that can be opened and closed as needed using any type of controllable door or covering (e.g., a slat door, hinged door, sliding door, and so forth). In some embodiments, for example, Coanda slot 307 may be opened when centrifugal blower system 300 is being used for anti-torque control, but may be closed when centrifugal blower system 300 is being used for directional control. Moreover, while the illustrated embodiment includes a single Coanda slot 307, other embodiments may include multiple Coanda slots. For example, in some embodiments, an additional Coanda slot may be positioned near the top of tail boom 302 and may be angled to direct airflow in the same direction as Coanda slot 307 (e.g., down the right side of tail boom 302).

The variable aperture doors 306 can be used to provide both anti-torque and direction control, for example, by directing a variable amount of thrust from the centrifugal blower 304 out through the side(s) of tail boom 302. In the illustrated embodiment, the right side of tail boom 302 includes an aperture door 306a near the top of the tail boom 302, and the left side of tail boom 302 includes an aperture door 306b near the bottom of the tail boom 302. These variable aperture doors 306 can be adjusted to vary the size of their respective openings, thus enabling a variable amount of thrust to be directed out either or both sides of tail boom 302. The aperture doors 306 can be any type of controllable door or covering, such as a hinged door, slat door, or sliding door, among other examples.

In this manner, centrifugal blower system 300 can be used to blow air radially out of the side(s) of tail boom 302, thus generating thrust and lift on the side(s) of the tail boom 302, which can be used to provide anti-torque and direction control for a rotorcraft. For example, the aperture doors 306 are positioned on each side of the tail boom 302 around centrifugal blower 304 (e.g., on the aft end of the tail boom 302), and can be opened and closed in order to direct the thrust generated by centrifugal blower 304. When devoted entirely to anti-torque control, one door 306 may be fully open and the other door 306 may be fully closed. In this manner, the entire thrust generated by centrifugal blower 304 is dedicated to anti-torque control, which may allow the blower to operate using less power. When used to provide both anti-torque and direction control, the aperture doors 306 may both be opened to different heights, resulting in split airflow, thus providing less anti-torque and more force in a particular direction. This enables a rotorcraft to yaw without a rudder, while still providing control to the pilot.

Figure 4:
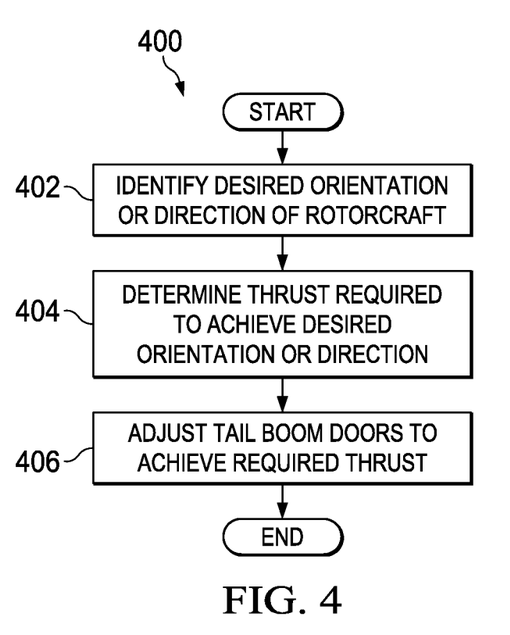
FIG. 4 illustrates a flowchart for rotorcraft anti-torque and direction control using a centrifugal blower system.

FIG. 4 illustrates a flowchart 400 for rotorcraft anti-torque and direction control using a centrifugal blower system. Flowchart 400 may be implemented, for example, using an embodiment of the centrifugal blower system described throughout this disclosure (e.g., centrifugal blower system 200 of FIGS. 2A and 2B and/or centrifugal blower system 300 of FIG. 3) in conjunction with other components and systems of a rotorcraft (e.g., flight controls, flight control systems, and so forth).

The flowchart may begin at block 402 by identifying a desired orientation or direction for a rotorcraft. In some cases, the desired orientation or direction of the rotorcraft may be controlled or selected by a pilot (e.g., using flight controls), a flight control system, and/or some combination of both. When in hover, for example, it may be desirable to maintain a particular orientation for the rotorcraft. When in forward flight, however, it may be desirable to either maintain a particular direction for the rotorcraft or maneuver the rotorcraft to change its direction.

The flowchart may then proceed to block 404 to determine the type of thrust required to achieve the desired orientation or direction of the rotorcraft. For example, when in hover, maintaining a particular orientation requires anti-torque control to counteract the torque effect from the main rotor. However, adjusting the orientation of the rotorcraft when in hover may require direction control. Similarly, changing the direction of the rotorcraft in forward flight requires direction control. Accordingly, the rotorcraft may include a centrifugal blower system to provide the anti-torque and direction control required for varying circumstances.

In some embodiments, for example, a centrifugal blower may be mounted inside the tail boom near the aft end. The centrifugal blower uses rotating fan blades to displace airflow radially while also increasing the speed and volume of the airflow, thus creating thrust. The requisite direction and intensity of the thrust may vary depending on the circumstances. For example, maintaining a particular orientation for a rotorcraft requires anti-torque control. Accordingly, when in hover, the centrifugal blower system may direct a particular amount of thrust in the opposite direction of the torque produced by the main rotor, thus counteracting the torque from the main rotor. In forward flight, however, less thrust may be needed from the centrifugal blower for anti-torque control (e.g., due to aerodynamics and anti-torque provided by other rotorcraft components, such as a vertical stabilizer). Moreover, adjusting the orientation or direction of the rotorcraft requires direction control. Accordingly, the centrifugal blower system may direct a particular amount of thrust in certain direction(s) to shift the tail of the rotorcraft to achieve the desired orientation or direction.

In this manner, the requisite direction and intensity of the thrust can be determined based on the particular circumstances.

The flowchart may then proceed to block 406 to adjust the tail boom doors to achieve the thrust required for the desired orientation or direction of the rotorcraft. In some embodiments, for example, the direction and intensity of the thrust may be controlled using doors or openings positioned on the tail boom around the centrifugal blower, such as variable aperture doors and adjustable Coanda slot(s).

For example, one or more Coanda slots can be positioned and angled on the tail boom to direct airflow down a particular side of the tail boom, producing a flow of air around the tail boom known as the Coanda effect. This creates thrust and generates lift on the side of the tail boom, which helps counteract the steady torque of the main rotor when in hover, thus providing a measure of anti-torque control. In some embodiments, a Coanda slot may be a fixed aperture that is always open. In other embodiments, however, a Coanda slot may be an adjustable aperture that can be opened and closed using any type of controllable door or covering (e.g., a slat door, hinged door, sliding door, and so forth). For example, a Coanda slot may be opened when the centrifugal blower system is being used for anti-torque control, but may be closed when the centrifugal blower system is being used for directional control.

Similarly, the variable aperture doors are positioned and angled to direct airflow out through the tail boom radially. The aperture doors can be any type of controllable door or covering, such as a hinged door, slat door, or sliding door, among other examples. In this manner, the variable aperture doors can be adjusted to vary the size of their respective openings, thus enabling a variable amount of thrust to be directed out either or both sides of the tail boom. For example, when devoted entirely to anti-torque control, one door may be fully open and the other door may be fully closed, thus using the entire thrust of the centrifugal blower for anti-torque control. However, when used to provide both anti-torque and direction control, the aperture doors may both be opened to different heights, resulting in split airflow, thus providing less anti-torque and more force in a particular direction. This enables a rotorcraft to yaw without a rudder, while still providing control to the pilot.

In this manner, the tail boom doors (e.g., variable aperture doors and/or adjustable Coanda slots) can be adjusted in order to achieve the thrust required for the desired orientation or direction of the rotorcraft.

At this point, the flowchart may be complete. In some embodiments, however, the flowchart may restart and/or certain blocks may be repeated.

The flowcharts and diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. A rotorcraft, comprising:
   a fuselage;
   a tail boom;
   a rotor system; and
   a centrifugal blower system, comprising:
      a centrifugal blower configured to generate thrust using an airflow, wherein the centrifugal blower is located within the tail boom and an axis of rotation of the centrifugal blower is parallel to a roll axis of the rotorcraft; and
      a plurality of ducts configured to control the thrust generated by the centrifugal blower, wherein the plurality of ducts are located on a portion of the tail boom surrounding the centrifugal blower, and wherein the plurality of ducts comprises one or more adjustable ducts configured to vary a size of an associated duct opening;
   wherein the centrifugal blower system is configured to control a direction of the thrust using the plurality of ducts; and
   wherein the centrifugal blower system is configured to direct the thrust out each of left and right sides of the tail boom.

2. The rotorcraft of claim 1, wherein the centrifugal blower system is configured to provide anti-torque control using the plurality of ducts to control the thrust.

3. The rotorcraft of claim 1, wherein the centrifugal blower system is configured to provide directional control using the plurality of ducts to control the thrust.

4. The rotorcraft of claim 1, wherein the centrifugal blower system is configured to direct the thrust out a particular side of the tail boom.

5. The rotorcraft of claim 1, wherein the centrifugal blower system is configured to control an intensity of the thrust using the one or more adjustable ducts.

6. The rotorcraft of claim 1, wherein the centrifugal blower system is configured to control an intensity of the thrust by adjusting a blade pitch of the centrifugal blower.

7. The rotorcraft of claim 1, wherein the plurality of ducts comprises one or more Coanda slots.

8. The rotorcraft of claim 1, wherein the centrifugal blower is positioned near an aft end of the tail boom.

9. The rotorcraft of claim 1, wherein the tail boom forms an airfoil shape.

10. The rotorcraft of claim 1, wherein the centrifugal blower is configured to obtain the airflow from an opening in an aft end of the tail boom.

11. The rotorcraft of claim 1, wherein the centrifugal blower is configured to obtain the airflow from a forward end of the tail boom through a duct near the rotor system.

12. An apparatus, comprising:
   a centrifugal blower system configured to control an orientation of a rotorcraft, wherein the centrifugal blower system comprises:
      a centrifugal blower configured to generate thrust out of a tail boom of the rotorcraft, wherein an axis of rotation of the centrifugal blower is parallel to a roll axis of the rotorcraft; and
      a plurality of ducts configured to control the thrust generated by the centrifugal blower, wherein the plurality of ducts comprises one or more adjustable ducts configured to vary a size of an associated duct opening;
   wherein the centrifugal blower system is configured to control a direction of the thrust using the plurality of ducts; and
   wherein the centrifugal blower system is configured to direct the thrust out each of left and right sides of the tail boom.

13. The apparatus of claim 12, wherein the centrifugal blower system is configured to provide anti-torque control using the plurality of ducts to control the thrust.

14. The apparatus of claim 12, wherein the centrifugal blower system is configured to provide directional control using the plurality of ducts to control the thrust.

15. The apparatus of claim 12, wherein the centrifugal blower system is configured to direct the thrust out a particular side of the tail boom.

16. The apparatus of claim 12, wherein the centrifugal blower system is configured to control an intensity of the thrust using the one or more adjustable ducts.

17. A method, comprising:
   identifying a target orientation for a rotorcraft;
   determining a configuration for a centrifugal blower system of the rotorcraft, wherein the configuration enables the centrifugal blower system to generate thrust for achieving the target orientation; and configuring the centrifugal blower system using the determined configuration;
wherein the centrifugal blower system comprises:
a centrifugal blower configured to generate thrust using an airflow, wherein the centrifugal blower is located within a tail boom of the rotorcraft and an axis of rotation of the centrifugal blower is parallel to a roll axis of the rotorcraft; and
a plurality of ducts configured to control the thrust generated by the centrifugal blower, wherein the plurality of ducts are located on a portion of the tail boom surrounding the centrifugal blower, and wherein the plurality of ducts comprises one or more adjustable ducts configured to vary a size of an associated duct opening;
wherein configuring the centrifugal blower system using the determined configuration comprises adjusting one or more of the ducts to control the thrust generated by the centrifugal blower system; and
wherein adjusting the one or more ducts to control the thrust generated by the centrifugal blower system comprises opening the plurality of ducts to generate thrust on each of left and right sides of the tail boom of the rotorcraft.

18. The method of claim 17, wherein adjusting the one or more ducts to control the thrust generated by the centrifugal blower system comprises opening a duct to generate thrust on a particular side of the tail boom of the rotorcraft.

* * * * *